US010525686B2

(12) United States Patent
Hwang et al.

(10) Patent No.: US 10,525,686 B2
(45) Date of Patent: Jan. 7, 2020

(54) FILTER APPARATUS HAVING A HOUSING AND FILTER MEDIA INSIDE THE HOUSING

(71) Applicant: AMOGREENTECH CO., LTD., Gimpo-si (KR)

(72) Inventors: Jun Sik Hwang, Incheon (KR); Kyung Su Kim, Bucheon-si (KR)

(73) Assignee: AMOGREENTECH CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/033,534

(22) Filed: Jul. 12, 2018

(65) Prior Publication Data
US 2018/0319146 A1 Nov. 8, 2018

Related U.S. Application Data

(62) Division of application No. 14/768,271, filed as application No. PCT/KR2014/001295 on Feb. 18, 2014, now abandoned.

(30) Foreign Application Priority Data

Feb. 18, 2013 (KR) .................. 10-2013-0016680
Feb. 18, 2014 (KR) .................. 10-2014-0018237

(51) Int. Cl.
*B01D 39/16* (2006.01)
*B01D 39/18* (2006.01)
(Continued)

(52) U.S. Cl.
CPC ...... *B32B 37/1207* (2013.01); *B01D 39/1623* (2013.01); *B01D 39/18* (2013.01);
(Continued)

(58) Field of Classification Search
CPC ............ B01D 29/0093; B01D 39/1623; B01D 39/18; B01D 2239/025; B01D 2239/0631;
(Continued)

(56) References Cited

U.S. PATENT DOCUMENTS 4,761,229 A 8/1988 Thompson et al.
5,482,625 A 1/1996 Shimizu et al.
(Continued)

FOREIGN PATENT DOCUMENTS

JP 2001104760 4/2001
KR 1020050037906 4/2005
(Continued)

OTHER PUBLICATIONS

International Search Report—PCT/KR2014/001295 dated May 15, 2014.

*Primary Examiner* — Benjamin L Lebron
(74) *Attorney, Agent, or Firm* — Cantor Colburn LLP (57) ABSTRACT

A filter apparatus includes: a housing having an inlet for supplying sewage or waste water into the housing, and an outlet for discharging purified water from the housing; and filter media arranged inside the housing. Each of the filter media includes: a porous substrate; a nanofiber web laminated on both surfaces of the porous substrate; and a fuse reinforcement material interposed between the nanofiber web and the porous substrate. The porous substrate is surrounded by the nanofiber web except for an upper edge of the porous substrate to form a protruding portion. The apparatus further includes: a discharge pipe connected to the outlet and including a fixing portion fixed to the protruding portion of the porous substrate and a connection tube connected to the fixing portion and connected to the outlet; and a pump connected to the outlet for pumping the purified water out of the housing.

5 Claims, 6 Drawing Sheets (51) Int. Cl.
*B29C 65/00* (2006.01)
*B32B 37/12* (2006.01)
*B32B 37/24* (2006.01)
*D01D 5/00* (2006.01)
*B82Y 40/00* (2011.01)
*B01D 29/00* (2006.01)
*B32B 5/02* (2006.01)
*B32B 5/08* (2006.01)

(52) U.S. Cl.
CPC .............. *B32B 37/24* (2013.01); *B82Y 40/00* (2013.01); *D01D 5/0084* (2013.01); *B01D 29/0093* (2013.01); *B01D 2239/025* (2013.01); *B01D 2239/0631* (2013.01); *B01D 2239/0654* (2013.01); *B01D 2239/0681* (2013.01); *B01D 2239/10* (2013.01); *B01D 2323/39* (2013.01); *B29C 66/71* (2013.01); *B32B 5/022* (2013.01); *B32B 5/08* (2013.01); *B32B 2037/1215* (2013.01); *B32B 2262/0238* (2013.01); *B32B 2305/20* (2013.01); *B32B 2307/724* (2013.01); *B32B 2327/12* (2013.01); *B32B 2379/00* (2013.01)

(58) Field of Classification Search
CPC .... B01D 2239/0654; B01D 2239/0681; B01D 2239/10; B29C 66/71; B32B 5/022; B32B 5/08; B32B 37/1207; B32B 37/24; B32B 2037/1215; B32B 2262/0238; B32B 2305/20; B32B 2307/724; B32B 2327/12; B32B 2379/00; B82Y 40/00; D01D 5/0084

See application file for complete search history.

(56) References Cited

U.S. PATENT DOCUMENTS

| | | | |
|---|---|---|---|
| 5,547,539 | A | 8/1996 | Arasawa et al. |
| 2003/0052054 | A1 | 3/2003 | Pearl et al. |
| 2008/0217807 | A1 | 9/2008 | Lee et al. |
| 2010/0028999 | A1 | 2/2010 | Nain |
| 2010/0096317 | A1 | 4/2010 | Morita et al. |
| 2010/0139224 | A1 | 6/2010 | Lim et al. |
| 2010/0193428 | A1 | 8/2010 | Hane et al. |
| 2012/0077015 | A1 | 3/2012 | Zhou et al. |
| 2013/0118973 | A1 | 5/2013 | Seo et al. |

FOREIGN PATENT DOCUMENTS

| | | |
|---|---|---|
| KR | 1020080060263 | 7/2008 |
| KR | 1020090129048 | 12/2009 |
| KR | 1020100098310 | 9/2010 |
| KR | 1020120002491 | 1/2012 |
| KR | 1020130011192 | 1/2013 |
| WO | 2012002754 | 1/2012 |

FILTER APPARATUS HAVING A HOUSING AND FILTER MEDIA INSIDE THE HOUSING

TECHNICAL FIELD

The present invention relates to a water treatment filter, and more specifically, to a filter medium employing nanofiber webs produced by using an electrospinning method, a method of manufacturing the filter medium, and a filter apparatus using the same.

BACKGROUND ART

Recent industrial advancement has required high purity and high quality of products, and thus a separator (or a membrane) technology has been recognized as a very important field. In the environmental sector, especially as the need for clean water and the awareness of a lack of water increases, a technology of using a membrane has largely attracted much attention as one of ways to solve these problems.

Processes such as water purification, sewage, waste water, and desalination using a membrane, are already spreading. In addition, the membrane technology has been developed for applications away from the membrane itself, and has expanded into surrounding technology development as well as has enhanced membrane performance improvement according to applications.

The membrane is a substance having a selection capability that is present between two different materials. In other words, the membrane means a substance which serves to selectively pass through or to exclude a material. Structures and substances of the membrane, and conditions and principles of the movement of the materials passing through the membrane, have no limitations. When a substance is located between only two materials to isolate the two materials each other, and the selective movement of the materials through the substance between the two materials occurs, the substance may be called a membrane.

The membranes are of a very variety of types and are classified into several criteria.

First, a classification by a separation operation is a classification method depending upon the state of a target material to be separated, and is classified into a liquid separation method, a gas-liquid separation method, a gas separation method, and so on. The liquid separation method is classified into micro filtration, ultra filtration, nano filtration, reverse osmosis filtration, etc., in accordance with the size of an object for filtration.

The gas separation method is classified in detail in accordance with the type of gas to be separated. The gas separation membrane is classified into an oxygen-enriched membrane for separating the oxygen gas, a nitrogen-enriched membrane for separating the nitrogen gas, a hydrogen-enriched membrane for separating the hydrogen gas, a dehumidifying film for removing humidity, etc.

The membrane is classified according to a film-like shape, and is classified into a flat membrane, a hollow fiber membrane, a tubular membrane, etc. In addition, the membrane is also classified into a plate-shaped type, a spiral wound type, a cartridge type, a flat membrane cell type, an immersion type, a tubular type, and so on, depending on the form of a filter module.

The membrane is classified according to a material and is classified into an inorganic film and an organic film using a polymer film. In recent years, however the inorganic films expand their use based on the advantages of heat resistance, durability, etc., most currently commercialized products are occupied by the polymer membranes.

In general, filtration means to remove two or more components from a fluid, that is, it means to separate undissolved particles (solid) from the fluid. Filtering mechanisms in the separation of the solid materials may be described as sieving, adsorption, dissolution, diffusion mechanisms. Except for some membranes such as gas separation membranes, reverse osmosis membranes, etc., it can be said that most of the filtering mechanisms depend entirely on the sieving mechanism.

Therefore, it is possible to use any materials with pores as filter media. Nonwoven fabrics (nonwovens), woven fabrics (wovens), meshes, porous membranes and the like are typical filter media.

It difficult to make pores not more than 1 μm in the case of nonwovens, wovens, meshes, etc. Thus, the nonwovens, wovens, meshes, etc., are used as a pretreatment filter concept with a limitation to a particle filtration area. Meanwhile, porous membranes can make precise and small pores and have been used for a process requiring a wide range of filtration areas and the highest precision such as micro filtration, ultra filtration, nano filtration, reverse osmosis filtration, etc.

Since the nonwovens, wovens, or meshes are made of fibers having a thickness from several micrometers to several hundreds of micrometers, it difficult to make fine pores not more than 1 μum. In particular, it is not possible actually to create uniform pores since webs are formed by random arrangement of fibers in the case of the nonwoven fabrics. The melt-blown nonwoven fabric may be called a nonwoven fabric made of a very fine fiber having a diameter of 1~5 μm. The pore size before heat calendaring is not less than six micrometers and the pore size after heat calendaring is only three micrometers approximately. The deviation in the average pore size occurs more than ±20% around a reference point, and the melt-blown nonwoven fabric has a structure in which very large pores coexist.

Accordingly, the nonwovens, wovens, or meshes have the difficulty in preventing the leakage of contaminated materials through relatively large pores and thus have low filter efficiency. Therefore, the filter media are used in an inaccurate filtration process or used as a pre-treatment concept of an accurate filtration process.

Meanwhile, the porous membrane is prepared by a method such as a non-solvent induced phase separation (NIPS) process, a thermally induced phase separation (TIPS) process, a stretching process, a track etching process, a sol-gel process, etc. The materials of most of the porous membranes are made of representative organic polymers, such as polytetrafluoroethylene (PTFE), polyvinylidene fluoride (PVdF), nylon (Nylon6 or Nylon66), polysulfone (PS), polyethersulfone (PES), polypropylene (PP), polyethylene (PE), nitrocellulose (NC) or the like. While the conventional porous membranes may create pores of precise and small size, closed pores or blinded pores may be created inevitably in the manufacturing process. As a result, the conventional porous membranes have problems such as a small flow amount of filtration, a high driving pressure, and a short filtration lift cycle, to thus cause high operating costs and frequent filter replacement.

Korean Patent Application Publication No. 2013-0011192 discloses a method of producing a composite nonwoven fabric of alumina including a first step of performing a plasma treatment of a thermoplastic polymer fiber nonwoven fabric modify the surface of the nonwoven fabric, and a second step of depositing the alumina on the surfacetreated fabric. However, the filter media using the alumina composite nonwoven fabric has no damage caused by cutting of the fiber, and is also excellent in the virus removal performance, but has a low filtering efficiency disadvantage due to the large pore size of the nonwoven fabric.

DISCLOSURE

Technical Problem

To solve the above problems or defects, it is an object of the present invention to provide a filter medium using a nanofiber web formed by an electrospinning method, to thereby improve endurance and freely control the pore size, to thus make a variety of products in accordance with an intended use, a method of manufacturing the filter medium, and a filter apparatus using the filter medium.

It is another object of the present invention to provide a filter medium using a nanofiber web formed by an electrospinning method, to thereby enable thickness of the filter medium to be made thin and thus thickness of a filter plate to be made thin, to accordingly laminate a large number of filter plates in a small space to thus reduce size of a filtration system, a method of manufacturing the filter medium, and a filter apparatus using the filter medium.

It is still another object of the present invention to provide a filter medium that is prepared by laminating a nanofiber web having three-dimensional fine pores and a nonwoven fabric, to thereby achieve excellent handling and strength, and improve filter efficiency, a method of manufacturing the filter medium, and a filter apparatus using the filter medium.

Technical Solution

To accomplish the above and other objects of the present invention, according to an aspect of the present invention, there is provided a filter medium comprising: a porous substrate; a nanofiber web that is laminated on both sides of the porous substrate, and that has a number of fine pores formed by electrospinning a polymer material; and an adhesive unit for adhering the porous substrate and the nanofiber web integrally, wherein the adhesive unit has a thermally fusing structure that is achieved by applying heat whose temperature is lower than the melting point of the porous substrate and higher than the melting point of the nanofiber web.

Alternatively, the adhesive unit has a thermally fusing structure that is achieved by applying heat whose temperature is higher than the melting point of the porous substrate and lower than the melting point of the nanofiber web.

In addition, the adhesive unit may be a hot-melt powder or a hot-melt web. The hot-melt powder is placed in a dot array pattern to thus obtain an air-permeability after adhesion, and the hot-melt web has a plurality of fine pores, is possible to ensure the air-permeability after adhesion.

In addition, the porous substrate is a nonwoven fabric of any one of a polyester-based, nylon-based, polyolefin-based and cellulose-based nonwoven fabric, and the polymer material forming the nanofiber web comprises a polyvinylidene fluoride (PVdF).

In addition, the polymer material is a mixture of PVdF and polyacrylonitrile (PAN) at a ratio of 5:5 or 6:4.

In addition, the thermally fusing structure is a structure that 1/5 to 1/2 the thickness of the nanofiber web is penetrated and bonded to the nonwoven fabric, or 1/5 to 1/2 the thickness of the nonwoven fabric is penetrated and bonded to the nonwoven fabric.

In addition, the nanofiber web has a structure that the nanofiber web is laminated on the entire surface except for the upper surface of the nonwoven fabric.

According to another aspect of the present invention, there is provided a filter medium comprising: a porous substrate; and a nanofiber web that is laminated on both sides of the porous substrate, and that has a number of fine pores formed by electrospinning a polymer material, wherein the nanofiber web comprises a first nanofiber web layer that is formed by electrospinning a low-concentration polymer material mixture solution and a second nanofiber web layer that is formed by electrospinning a high-concentration polymer material mixture solution.

In addition, the low-concentration polymer material mixture solution contains a polymer material of 8~10 wt %, and the high-concentration polymer material mixture solution contains a polymer material of 15~17 wt %.

According to another aspect of the present invention, there is provided a method of manufacturing a filter medium comprising the steps of: preparing a nonwoven fabric; electrospinning a polymer material on a release paper, to thus form a nanofiber web; and laminating the nanofiber web on both surfaces of the nonwoven fabric, and heating the laminated result at a temperature lower than the melting point of the nonwoven fabric and higher than the melting point of the nanofiber web, thus thermally fusing the nonwoven fabric and the nanofiber web.

Alternatively, the thermally fusing is achieved by applying heat whose temperature is higher than the melting point of the porous substrate and lower than the melting point of the nanofiber web.

According to another aspect of the present invention, there is provided a method of manufacturing a filter medium comprising the steps of: preparing a nonwoven fabric; electrospinning a low-concentration polymer material mixture solution containing a polymer material of 8~10 wt %, and a high-concentration polymer material mixture solution containing a polymer material of 15~17 wt % in sequence, on one surface of the nonwoven fabric, to thus form a nanofiber web; and electrospinning the low-concentration polymer material mixture solution containing the polymer material of 8~10 wt %, and the high-concentration polymer material mixture solution containing the polymer material of 15~17 wt % in sequence, on the other surface of the nonwoven fabric, to thus form a nanofiber web.

According to another aspect of the present invention, there is provided a method of manufacturing a filter medium comprising the steps of: preparing a nonwoven fabric; electrospinning a polymer material on a release paper, to thus form a nanofiber web; and laminating and thermally fusing the nanofiber web via a hot-melt powder or hot-melt web on both surfaces of the nonwoven fabric.

According to another aspect of the present invention, there is provided a filter apparatus comprising: a housing having an inlet and an outlet for sewage or waste water; a plurality of filter media that are arranged at a predetermined interval in the housing, and for filtering the waste water stored in the housing; and a pump that is connected to the outlet for pumping the water of the housing, or supplying wash water into the housing.

The filter apparatus further comprises a nozzle for generating bubbles, which is provided at one side of the housing and washes a filter medium.

Advantageous Effects

As described above, the present invention provides a filter medium that is formed by bonding a nanofiber web formed by an electrospinning method on both sides of a nonwoven fabric by using a thermally fusing structure or a hot melt adhesive, to thereby improve endurance and freely control the pore size, to thus make a variety of products in accordance with an intended use.

In addition, the present invention provides a filter medium using a nanofiber web formed by an electrospinning method, to thereby enable thickness of the filter medium to be made thin and thus thickness of a filter plate to be made thin, to accordingly laminate a large number of filter plates in a small space to thus reduce size of a filtration system.

Further, the present invention provides a filter medium that is prepared by laminating a nanofiber web having three-dimensional fine pores and a nonwoven fabric, to thereby provide a filter apparatus capable of achieving excellent handling and strength, and improving filter efficiency.

BEST MODE

Hereinafter, embodiments of the present invention will be described with reference to the accompanying drawings. In the process, the sizes and shapes of components illustrated in the drawings may be shown exaggerated for convenience and clarity of explanation. Further, by considering the configuration and operation of the present invention the specifically defined terms may be changed according to user's or operator's intention, or the custom. Definitions of these terms herein need to be made based on the contents across the whole application.

Figure 1:
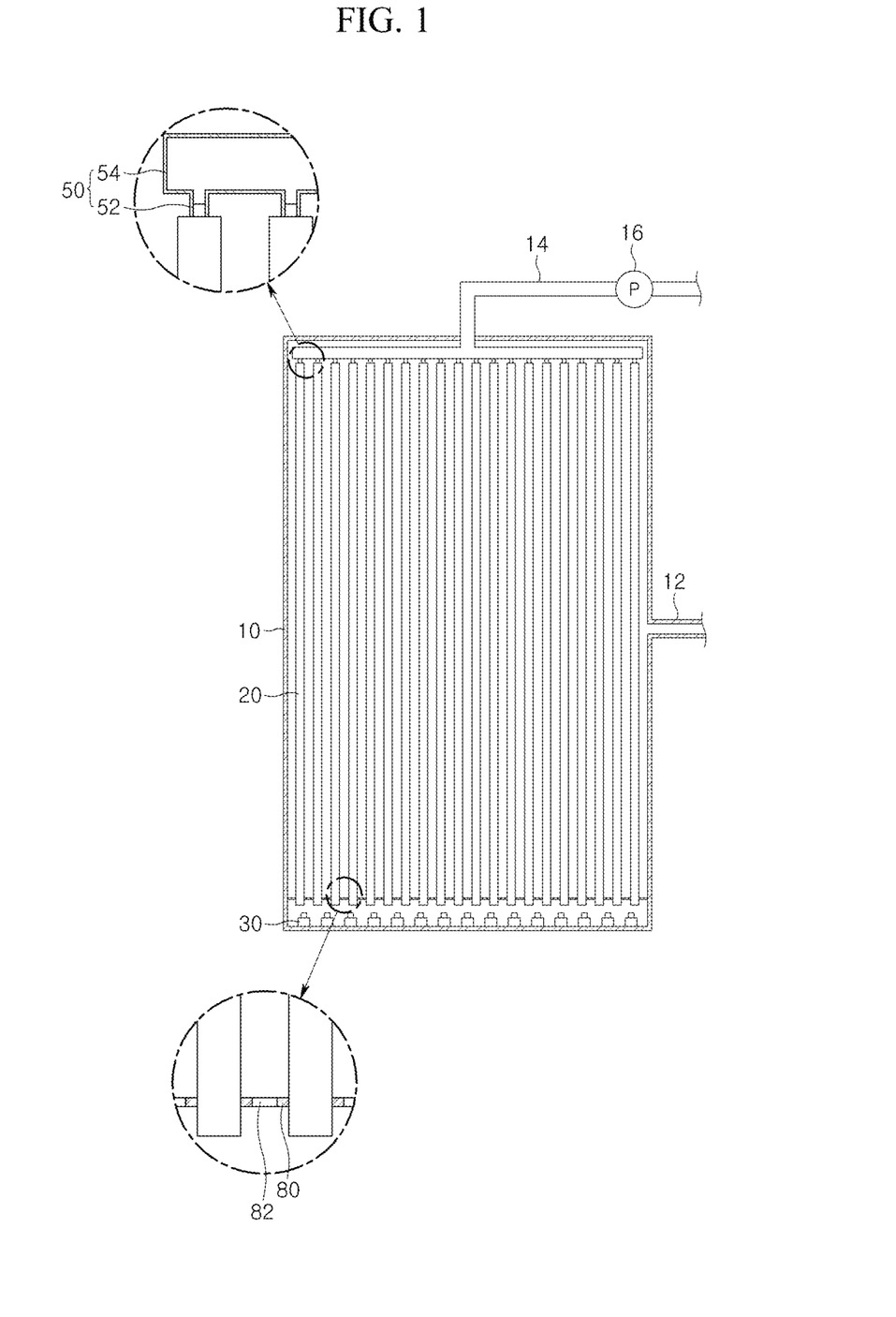
FIG. 1 is a cross-sectional view of a filter apparatus according to an embodiment of the present invention.

FIG. 1 is a cross-sectional view of a filter apparatus according to an embodiment of the present invention.

Referring to FIG. 1, a filter apparatus according to an embodiment of the present invention includes: a housing 10 in which sewage or waste water is externally introduced and stored; a plurality of filter media 20 that are arranged at a predetermined interval in the housing 10, and for filtering the sewage or waste water stored in the housing 10; and a plurality of bubble generating nozzles 30 that are arranged at the lower side of the housing 10 to thus function to flush the filter media 20.

The housing 10 is provided with an inlet 12 through which water to be purified, for example, polluted water such as sewage water or waste water is introduced, and an outlet 14 that is formed at the upper side of the housing 10 and through which water purified in the housing 10 is externally discharged.

Figure 2:
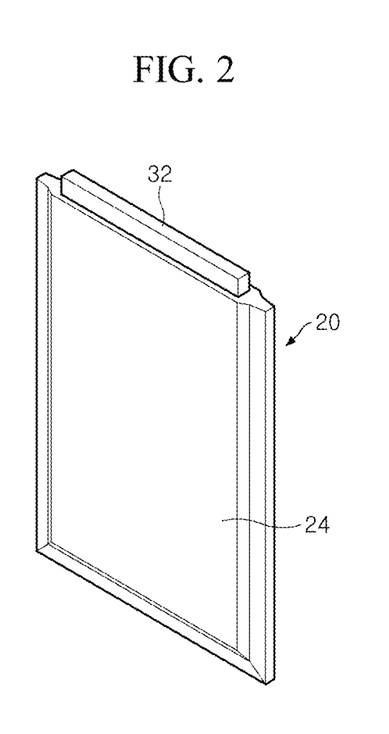
FIG. 2 is a plan view of a filter medium according to one embodiment of the present invention.
Figure 3:
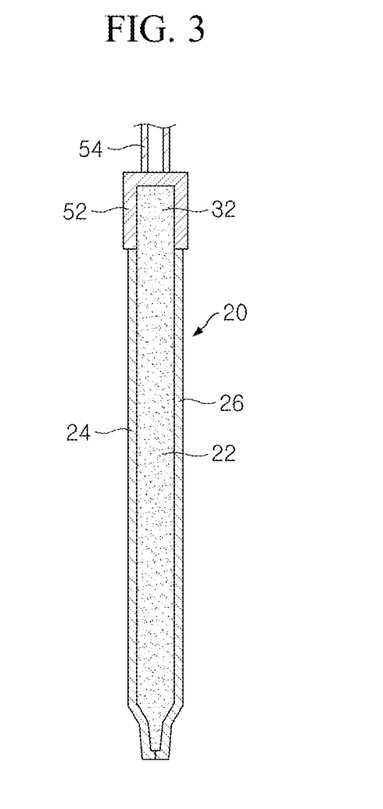
FIG. 3 is a cross-sectional view of a filter medium according to one embodiment of the present invention.

As shown in FIGS. 2 and 3, each of the filter media 20 includes: a nonwoven fabric 22 having a plurality of pores through which water can pass; a first nanofiber web 24 that is laminated on one surface of the nonwoven fabric 22 and having fine pores capable of filtering the water; and a second nanofiber web 26 that is laminated on the other surface of the nonwoven fabric 22 and having fine pores capable of filtering the water.

The filter media 20 are arranged at a predetermined interval in the housing 10, and filter the sewage or waste water stored in the housing 10.

Here, the nonwoven fabric that can be used in the present invention is any one of, for example, a melt-blown nonwoven fabric, a spun bond nonwoven fabric, a thermal bond nonwoven fabric, a chemical bond nonwoven fabric, and a wet-raid nonwoven fabric. The nonwoven fabric may include fibers having diameters of about 30 μm to about 60 μm, and pores of diameters of about 50 μm to about 200 μm.

The nonwoven fabric 22 includes a large number of pores and thus plays a role of a path through which water can pass, as well as a support layer for supporting the first nanofiber web 24 and the second nanofiber web 26 to maintain a flat type.

In the present invention, the filter medium may be implemented by laminating a nanofiber web on both sides of a nonwoven fabric as a porous substrate having a number of pores, in which the nanofiber web has a number of fine pores formed by electrospinning a polymer material. In this case, the filter medium may include an adhesive unit for adhering the nonwoven fabric and the nanofiber web integrally.

The adhesive unit may have a thermally fusing structure that is achieved by applying heat whose temperature is lower than the melting point of the porous substrate and higher than the melting point of the nanofiber web.

The porous substrate may be a nonwoven fabric of any one of a polyester-based, nylon-based, polyolefin-based and cellulose-based nonwoven fabric, and the polymer material forming the nanofiber web may include a polyvinylidene fluoride (PVdF).

Further, the polymer material that is electrospun in order to form the nanofiber web is a mixture of PVdF and polyacrylonitrile (PAN) at a ratio of 5:5 or 6:4, and the thermally fusing structure is a structure that ⅕ to ½ the thickness of the nanofiber web is penetrated and bonded to the nonwoven fabric.

As described above, when thermal compression is performed by applying heat whose temperature is lower than the melting point of the porous substrate and higher than the melting point of the nanofiber web, a portion of the nanofiber web, that is, ⅕ to ½ the thickness of the nanofiber web is melted and penetrated and strongly adhered to the porous substrate, for example, the nonwoven fabric.

Alternatively, the thermally fusing structure is achieved by thermally compressing and bonding two members, that is, the porous substrate and the nanofiber web, by applying heat whose temperature is higher than the melting point of the porous substrate and lower than the melting point of the nanofiber web. In this case, ⅕ to ½ the thickness of the porous substrate is melted and penetrated and strongly adhered to the porous substrate, for example, the nonwoven fabric.

In the filter medium having a thermally fusing structure as described above, the nanofiber web may have a structure that the nanofiber web is laminated on the entire surface except for the upper surface of the porous substrate, that is, the nonwoven fabric.

Meanwhile, according to another aspect of the invention, a filter medium may also be configured by directly electrospinning a first nanofiber web 24 and a second nanofiber web 26 on a porous substrate, that is, a nonwoven fabric so as to be strongly adhered thereto.

Figure 4:
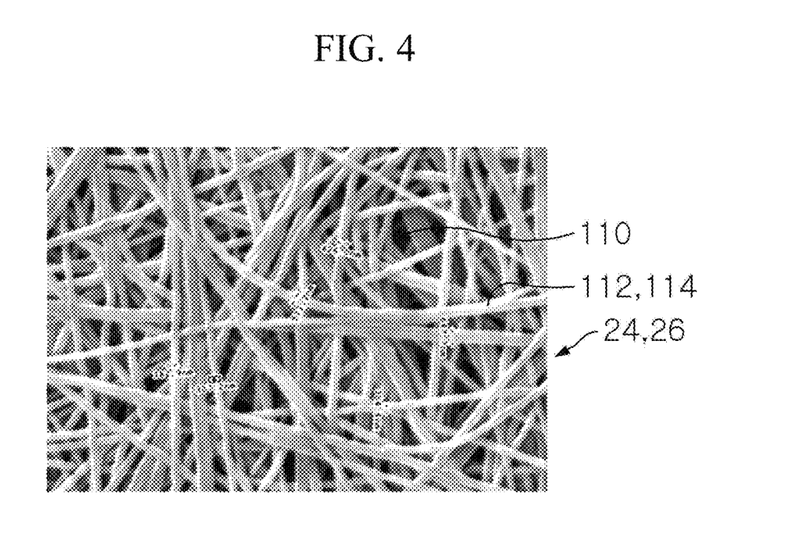
FIG. 4 is a close-up photograph of nanofiber webs in accordance with one embodiment of the present invention.

That is, as shown in FIG. 4, the first nanofiber web 24 and the second nanofiber web 26 are formed by using a process having the steps of: preparing a spinning solution by mixing a polymer material and a solvent at a constant mixture ratio in which the polymer material can be electrospun; forming nanofibers 112 and 114 by electrospinning the spinning solution; and accumulating the nanofibers 112 and 114 on the surface of the nonwoven fabric 22 to thus have fine pores 110 through which water may be filtered.

Here, diameters of the nanofibers 112 and 114 are preferably in the range of 0.1 µm to 3.0 µm.

The thicknesses of the first nanofiber web 24 and the second nanofiber web 26 are freely adjusted according to electrospinning time from the electrospinning apparatus, and the sizes of the pores 110 are determined by the thicknesses of the nanofiber webs.

Therefore, since the sizes of the pores 110 of the first nanofiber web 24 and the second nanofiber web 26 may be freely adjusted in the present embodiment, the sizes of the pores 110 may be produced in various ways according to type of a filter.

Thus, the filter medium that is configured by forming a nanofiber web by directly electrospinning a polymer material on both sides of a nonwoven fabric as described above, includes: a porous substrate; and a nanofiber web that is formed by directly electrospinning a polymer material on both sides of the porous substrate in which the nanofiber web has fine pores.

In this case, the nanofiber web includes a first nanofiber web layer that is formed by electrospinning a low-concentration polymer material mixture solution and a second nanofiber web layer that is formed by electrospinning a high-concentration polymer material mixture solution. Here, the first nanofiber web layer may be formed by a coating or spraying method as well as electrospinning.

In addition, the low-concentration polymer material mixture solution contains a polymer material of 8~10 wt %, and the high-concentration polymer material mixture solution contains a polymer material of 15~17 wt %.

The polymer material used for the embodiments of the present invention may include, for example, hydrophilic polymers or/and hydrophobic polymers that can be electrospun, or may include one kind of the polymers or a mixture of two or more kinds of the polymers.

The polymer materials used in the embodiments of the present invention may be resins that may be dissolved in an organic solvent for electrospinning, and that may be capable of forming nanofibers by electrospinning, but are not specifically limited thereto. For example, the polymer materials used in the present invention may be: polyvinylidene fluoride (PVdF), poly(vinylidene fluoride-co-hexafluoropropylene), perfluoropolymer, polyvinyl chloride, polyvinylidene chloride, or copolymers thereof; polyethylene glycol derivative containing polyethylene glycol dialkylether and polyethylene glycol dialkyl ester; poly(oxymethylene-oligo-oxyethylene); polyoxide containing polyethylene oxide and polypropylene oxide; polyvinyl acetate, poly(vinyl pyrrolidone-vinyl acetate), polystyrene, and a polystyrene acrylonitrile copolymer; a polyacrylonitrile copolymer containing polyacrylonitrile (PAN) and a polyacrylonitrile methyl methacrylate copolymer; or polymethyl methacrylate, a poly methyl methacrylate copolymer, or a mixture thereof.

Also, the polymer material used in the present invention may be: aromatic polyester such as polyamide, polyimide, polyamideimide, poly(meta-phenylene isophthal amide), polyester sulfone (PES), polyether ketone, polyetherimide (PEI), polyethylene terephthalate, polytrimethylene terephthalate, or polyethylene naphthalate; polyphosphazene such as polytetrafluoroethylene, polydifenoxiphosphazene, poly{bis[2-(2-methoxyethoxy) phosphazene]}; polyurethane, and polyurethane copolymer containing polyether urethane; or cellulose acetate, cellulose acetate butyrate, cellulose acetate propionate.

The polymer materials that may be particularly desirably used as the filter material of the present invention may be polyacrylonitrile (PAN), polyvinylidene fluoride (PVdF), polyester sulfone (PES), and polystyrene (PS), alone or a mixture of polyvinylidene fluoride (PVdF) and polyacrylonitrile (PAN), a mixture of PVdF and PES, or a mixture of PVdF and thermoplastic polyurethane (TPU).

Referring back to FIGS. 1 to 3, each of the filter media 20 is formed so that the first nanofiber web 24 and the second nanofiber web 26 are respectively laminated on both surfaces of the nonwoven fabric 22, the other three side edges except for the upper surface of the nonwoven fabric 22 are compressed by a thermal compression method so that the first nanofiber web 24 and the second nanofiber web 26 are formed to surround the side portion of the nonwoven fabric 22, the upper surface of the nonwoven fabric 22 protrudes with respect to the first nanofiber web 24 and the second nanofiber web 26, the protruding portion 32 of the nonwoven fabric 22 is connected to a discharge pipe 50 through which water purified via the nonwoven fabric 22 is discharged.

Here, the discharge pipe 50 includes: a fixing portion 52 that is fixed to wrap the protruding portion 32 of the nonwoven fabric 22 so that only water that has passed through the nonwoven fabric 22 can be discharged; and a connection tube 54 that is connected to the fixing portion 52 and that is connected to an outlet 14 formed in the housing 10.

Bubble generating nozzles 30 arranged at the lower side of the housing 10 are connected to a compressor (not shown) or the like by which air can be externally injected, and are arranged in plurality on the bottom surface of the housing 10.

Here, the bubble generating nozzles 30 serve to discharge air into the housing 10, to thus generate bubbles and water flows and thus serve to remove an adhesion material adhered on the surfaces of the filter media 20.

Any forms of nozzles capable of generating a flow of water and air bubbles are applicable to the structures of the bubble generating nozzles 30. In addition, a discharge passage (not shown) is formed on the bottom of the housing 10, in which foreign substances accumulated on the bottom of the housing 10 by washing the filter media 20 are discharged through the discharge passage.

A method of manufacturing filter media according to an embodiment of the present invention will be described in detail in the following.

Figure 5:
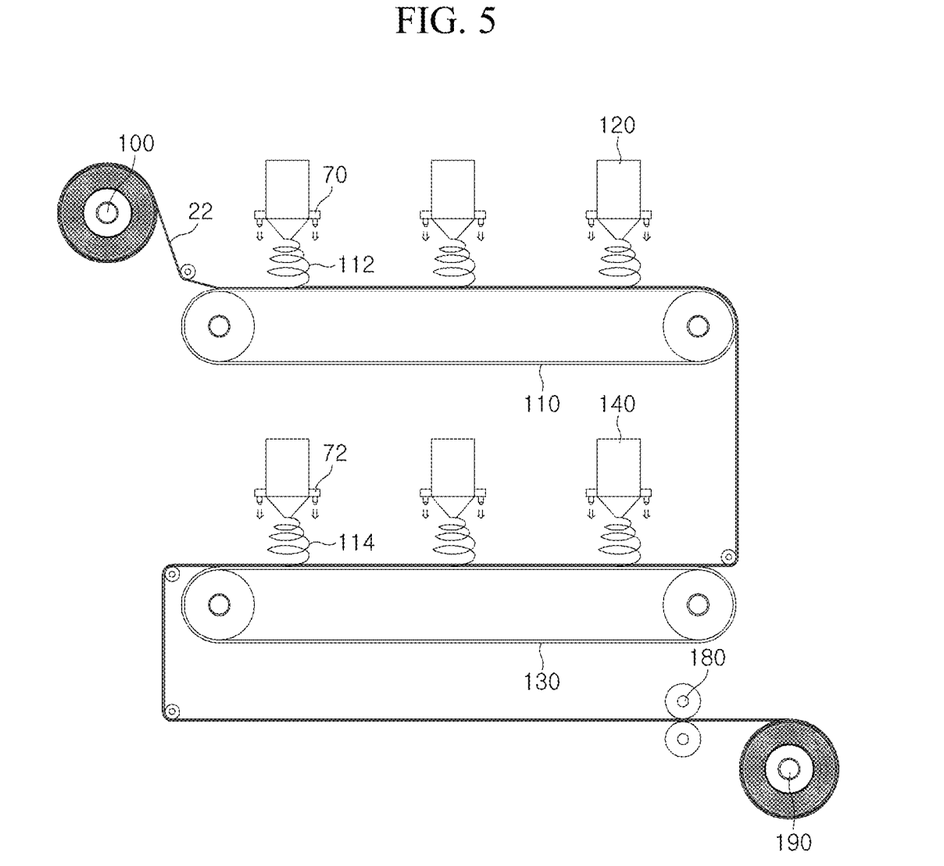
FIG. 5 is a schematic diagram of an electrospinning apparatus for forming a nanofiber web of a filter medium in accordance with an embodiment of the present invention.

FIG. 5 is a schematic diagram of an electrospinning apparatus that manufactures a filter medium in accordance with an embodiment of the present invention.

The electrospinning apparatus according to an embodiment of the present invention includes: a first collector 110 along which a nonwoven fabric 22 is transferred; first spinning nozzles 120 disposed on the upper surface of the first collector 110 and connected to a high voltage generator (not shown) to thus form a first nanofiber web 24 on one surface of the nonwoven fabric 22; a second collector 130 along which the other surface of the nonwoven fabric 22 on the one surface of which the first nanofiber web 24 has been formed is transferred to face upward; and second spinning nozzles 140 disposed on the upper surface of the second collector 130 and connected to a high voltage generator (not shown) to thus form a second nanofiber web 26 on the other surface of the nonwoven fabric 22.

The first spinning nozzles 120 and the second spinning nozzles 140 serve to produce ultrafine nanofiber yarns by electrospinning a spinning solution that is formed by mixing a polymer material and a solvent.

A nonwoven fabric roll 100 on which the nonwoven fabric 22 is wound is arranged in the front side of the first collector 110, and a filter media roll 190 on which filter media 20 laminated with the first nanofiber web 24 and the second nanofiber web 26 are wound is arranged in the rear side of the second collector 130.

When a high-voltage electrostatic force of 90 through 120 Kv is applied between the first collector 110 and each of the first spinning nozzles 120 and between the second collector 130 and each of the second spinning nozzles 140, ultrafine fiber strands 112 and 114 are spun to thus form an ultrafine nanofiber web.

Air spraying devices 70 and 72 are provided on the first spinning nozzles 120 and the second spinning nozzles 140, respectively, and thus the fiber strands spun from the first spinning nozzles 120 and the second spinning nozzles 140 are prevented from blowing without being captured by the first and second collectors 110 and 130.

The multi-hole spin pack nozzles used in the present invention are made to set air pressure of air spraying to be in the range of about 0.1 to about 0.6 MPa. In this case, air pressure less than about 0.1 MPa, does not contribute to capture and integrate the flying fibers. In the case that air pressure exceeds about 0.6 MPa, the cone of each spinning nozzle is hardened to thus cause a clogging phenomenon of the needle to occur and to thereby cause a spinning trouble to occur.

In this way, a process of preparing the filter media by using the electrospinning device as constructed above will be described in the following.

First, when the first collector 110 is driven, the nonwoven fabric 22 rolled on the nonwoven fabric roll 100 is moved along the upper surface of the first collector 110.

In addition, when a high-voltage electrostatic force is applied between the first collector 110 and each of the first spinning nozzles 120, a spinning solution from the first spinning nozzles 120 is made into ultrafine fiber strands 112 and spun on one surface of the nonwoven fabric 22. Then, ultrafine fiber strands are accumulated on one surface of the nonwoven fabric 22, and thus the first nanofiber web 24 having ultrafine pores is formed.

Then, when the first nanofiber web 24 is completely produced, a process of laminating the second nanofiber web 26 on the other side of the nonwoven fabric 22 is performed.

In other words, the nonwoven fabric 22 on one surface of which the first nanofiber web 24 is laminated is moved to the second collector 130. In this case, since the second collector 130 is disposed on the lower side of the first collector 110, the nonwoven fabric 22 is moved to the second collector 130 in a 180° reversed state. Then, the other surface of the nonwoven fabric 22 faces upward.

In addition, when a high-voltage electrostatic force is applied between the second collector 130 and each of the second spinning nozzles 140, a spinning solution from the second spinning nozzles 140 is made into ultrafine fiber strands 114 and spun on the other surface of the nonwoven fabric 22. Then, ultrafine fiber strands are accumulated on the other surface of the nonwoven fabric 22, and thus the first nanofiber web 26 having ultrafine pores is formed.

The filter media 20 prepared via these processes are pressurized to a predetermined thickness while passing through a pressure roller 180, to then be wound on a filter medium roll 190.

Here, in some embodiments, there is provided a method of manufacturing a filter medium comprising the steps of: preparing a nonwoven fabric; electrospinning a low-concentration polymer material mixture solution containing a polymer material of 8~10 wt %, and a high-concentration polymer material mixture solution containing a polymer material of 15~17 wt % in sequence, on one surface of the nonwoven fabric, to thus form a nanofiber web; and electrospinning the low-concentration polymer material mixture solution containing the polymer material of 8~10 wt %, and the high-concentration polymer material mixture solution containing the polymer material of 15~17 wt % in sequence, on the other surface of the nonwoven fabric, to thus form a nanofiber web.

In addition, in some embodiments, there is also provided a method of manufacturing a filter medium comprising the steps of: preparing a nonwoven fabric; electrospinning a polymer material on a release paper, to thus form a nanofiber web; and laminating the nanofiber web on both surfaces of the nonwoven fabric, and heating the laminated result at a temperature higher than the melting point of the nonwoven fabric and lower than the melting point of the nanofiber web, thus thermally fusing the nonwoven fabric and the nanofiber web.

Further, according to another embodiment of the present invention, the filter medium may be prepared by adhering a nonwoven fiber and a nanofiber web by using a hot melt powder or a hot melt web.

Hereinbelow, operation of a filter apparatus formed of the filter media will be described.

When water flows into the housing 10 for filtering, a pump 16 connected to the outlet 14 is driven to make the water pass through the filter media 20 to thus be filtered and then discharged via the outlet 14.

Further, when a process of washing the filter media 20 is performed to remove materials attached to the surfaces of the filter media 20, the pump 16 is driven in the reverse direction to thus make the wash water introduced into the housing 10 through the outlet 14. The wash water may include chemicals needed to wash the filter media.

Here, the pump 16 is connected to the outlet 14, thus housing 10, performing the function of pumping the water through the outlet 14 out of the housing 10 or supplying the wash water into the housing 10 through the outlet 14.

When the wash water is introduced into the housing 10 through the outlet 14, the wash water introduced through the nonwoven fabric 22 is discharged through the first nanofiber web 24 and the second nanofiber web 26, to thereby make materials attached to the first nanofiber web 24 and the second nanofiber web 26 detached therefrom.

Then, bubbles generated from the bubble generating nozzles 30 are supplied to the surfaces of the first nanofiber web 24 and the second nanofiber web 26, to thus play a role of making materials attached to the first nanofiber web 24 and the second nanofiber web 26 detached therefrom. In other words, the bubble generating nozzles 30 are provided at one side of the housing 10 and serve to wash the filter media 20.

Figure 6:
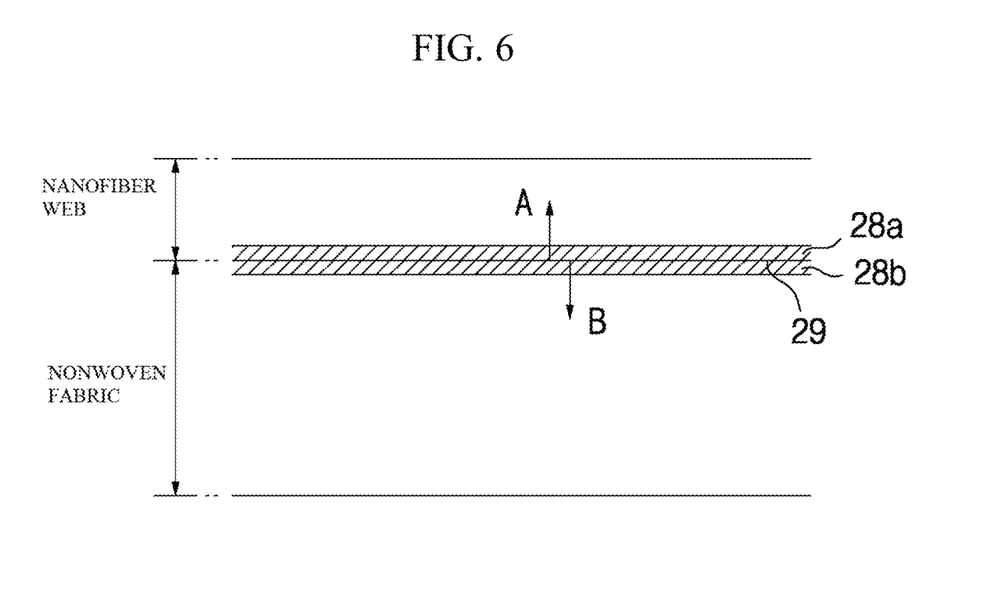
FIG. 6 is a partial sectional view illustrating a filter medium according to an embodiment of the present invention.
Figure 7:
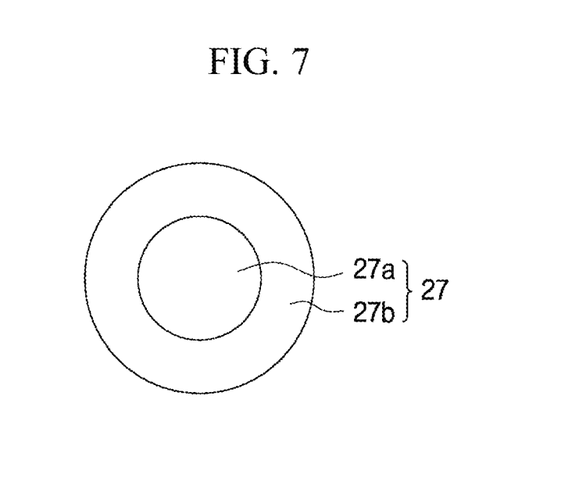
FIG. 7 is an enlarged cross-sectional view of a nanofiber web that is applied to a filter medium in accordance with an embodiment of the present invention.

FIG. 6 is a partial sectional view illustrating a filter medium according to an embodiment of the present invention. FIG. 7 is an enlarged cross-sectional view of a nanofiber in a nanofiber web in accordance with an embodiment of the present invention.

The above-described filter medium has a structure in which a nanofiber web is laminated on a nonwoven fabric. The nanofiber web may be implemented in a structure of a first nanofiber web laminated on one surface of a nonwoven fabric and a second nanofiber web laminated on the other surface of the nonwoven fabric, or in a structure in which a nanofiber web is laminated on the entire surface except for the upper surface of the nonwoven fabric.

In this case, the nonwoven fabric and the nanofiber web may be fused by thermal compression. The melting point of the nanofiber web is designed to be lower than the melting point of the nonwoven fabric, so that the nanofiber web is preferably melted and fused to the nonwoven fabric by heat applied during thermal compression. For example, when the polymer material for forming a nanofiber web is applied as PVdF, the melting point of PVdF is 155° C., and thus the nonwoven fabric includes a polyester-based, nylon-based, or cellulose-based nonwoven fabric having a melting point higher than 155° C.

Therefore, during thermal compression, the nanofiber web region contacting the nonwoven fabric is melted and fused on the nonwoven fabric. Here, since the pore size of the nonwoven fabric is much greater than the pore size of the nanofiber web, a portion of the melted nanofiber web is penetrated into the pores of the nonwoven fabric. That is, as shown in FIG. 6, based on a boundary surface 29 between a nonwoven fabric 28b and a nanofiber web 28a prior to thermal compression, the melted nanofiber web after thermal compression is spread in distribution in the nanofiber web direction (A) and the nonwoven fabric direction (B), from the boundary surface 29. When an amount of the melted nanofiber web is controlled based on this technical feature, the melted nanofiber web enters the pores of the nonwoven fabric. Accordingly, the melted nanofiber web having entered the pores of the nonwoven fabric plays a role of a locking function to thus improve adhesion between the nanofiber web and the nonwoven fabric.

In some embodiments, a polymer material forming the nanofiber web includes a mixture of polyvinylidene fluoride (PVdF) and polyacrylonitrile (PAN) at a ratio of 5:5 or 6:4. In this case, as shown in FIG. 7, an electrospun nanofiber is formed to include a core 27a made of PAN and an outer skin 27b surrounding the outer peripheral surface of the core 27a and made of PVdF. The nanofibers of this structure are stacked to form a nanofiber web. When the nanofiber web that is formed by laminating the nanofibers each having the structure of the core 27a and the outer skin 27b, and the nonwoven fabric are thermally compressed, the PVdF the outer skin 27b is melted and penetrated to be fused into the nonwoven fabric.

According to another embodiment of the present invention, a fuse reinforcement material (not shown) is interposed between the nanofiber web and the nonwoven fabric. The fuse reinforcement material may have a good adhesion force respectively with a nanofiber web and a nonwoven fabric. That is, since the nanofiber web is fused on one surface of the fuse reinforcement material, and the nonwoven fabric is fused on the other side of the fuse reinforcement material, the nanofiber web and the nonwoven fabric are fused by using the fuse reinforcement material. As a result, a bonding strength between the nanofiber web and the nonwoven fabric when using the fuse reinforcement material may be further increased in comparison with the case that the nanofiber web and the nonwoven fabric are fused by thermal compression. Therefore, this filter medium structure may remarkably reduce a delamination phenomenon between the nanofiber web and the nonwoven fabric that may occur during iteratively performing a filter function and a washing function in the filter apparatus. In this case, the fusion process may be the process of respectively melting the nanofiber web and the nonwoven fabric by thermal compression, and then fusing the nanofiber web and the nonwoven fabric by using the fuse reinforcement material.

Further, the fuse reinforcement material should include openings through which water can passed. These openings connect pores of the nanofiber web with pores of the nonwoven fabric, so that water can pass smoothly between the nanofiber web and the nonwoven fabric. In addition, the fuse reinforcement material may be implemented with a material having the ability to enhance the strength of the filter medium.

The fuse reinforcement material may include a hot melt powder or a hot-melt web.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

The present invention may be applied to a filter medium employing a nanofiber web that is prepared by electrospinning.

The invention claimed is:

1. A filter apparatus comprising:
a housing having an inlet for supplying sewage or waste water into the housing, and an outlet for discharging purified water from the housing;
a plurality of filter media, the filter media being arranged at a predetermined interval inside the housing, and for filtering the sewage or the waste water stored in the housing, wherein each of the plurality of filter media comprises: a porous substrate; a nanofiber web laminated on both surfaces of the porous substrate, the nanofiber web being formed of accumulated nanofibers made of a polymer material and having a number of fine pores; and a fuse reinforcement material interposed between the nanofiber web and the porous substrate for adhesion with the nanofiber web and the porous substrate integrally, and wherein the porous substrate is surrounded by the nanofiber web except for an upper edge of the porous substrate, the upper edge of the porous substrate protrudes with respect to the nanofiber web to form a protruding portion;
a discharge pipe disposed inside the housing and connected to the outlet, the discharge pipe including: a fixing portion wrapping around and fixed to the protruding portion of the porous substrate; and a connection tube connected to the fixing portion and connected to the outlet, thereby discharging the purified water via the porous substrate through the discharge pipe; and
a pump connected to the outlet for pumping the purified water out of the housing.

2. The filter apparatus according to claim 1, further comprising a nozzle for generating bubbles, which is provided at one side of the housing and washes the filter media.

3. The filter apparatus according to claim 1, wherein the porous substrate is any one of a polyester-based nonwoven fabric, a nylon-based nonwoven fabric, a polyolefin-based nonwoven fabric and a cellulose-based nonwoven fabric, and the polymer material comprises a polyvinylidene fluoride (PVdF).

4. The filter apparatus according to claim 1, wherein the polymer material is a mixture of PVdF and polyacrylonitrile (PAN) at a ratio of 5:5 or 6:4.

5. The filter apparatus according to claim 1, wherein the nanofiber web comprises a first nanofiber web layer formed of a low-concentration polymer material and a second nanofiber web layer formed of a high-concentration polymer material.

* * * * *